Aug. 6, 1935.                F. RIDDELL                    2,010,322
               COMBINED LIGHTING AND VENTILATING FIXTURE
                   Filed April 8, 1931        8 Sheets-Sheet 1
FIG. I.
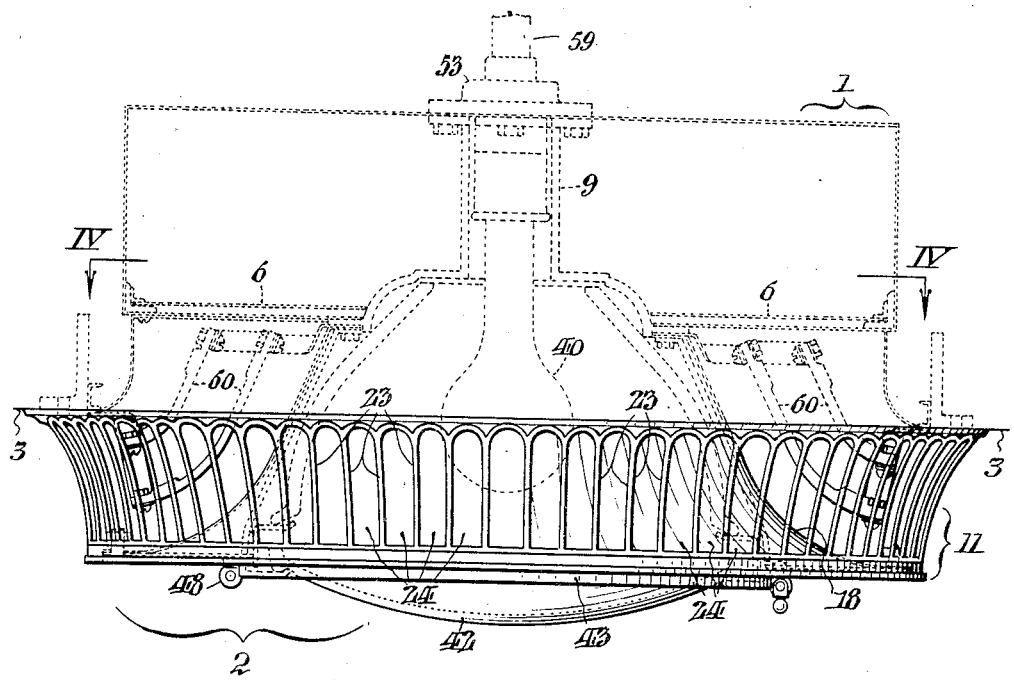
FIG. III.
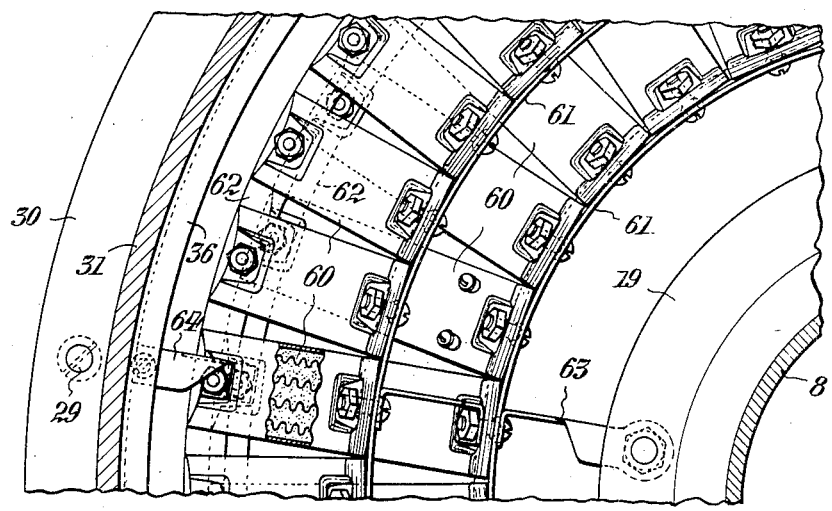
WITNESSES                                     INVENTOR:
                                              Frank Riddell,
                                           BY
                                                    ATTORNEYS.

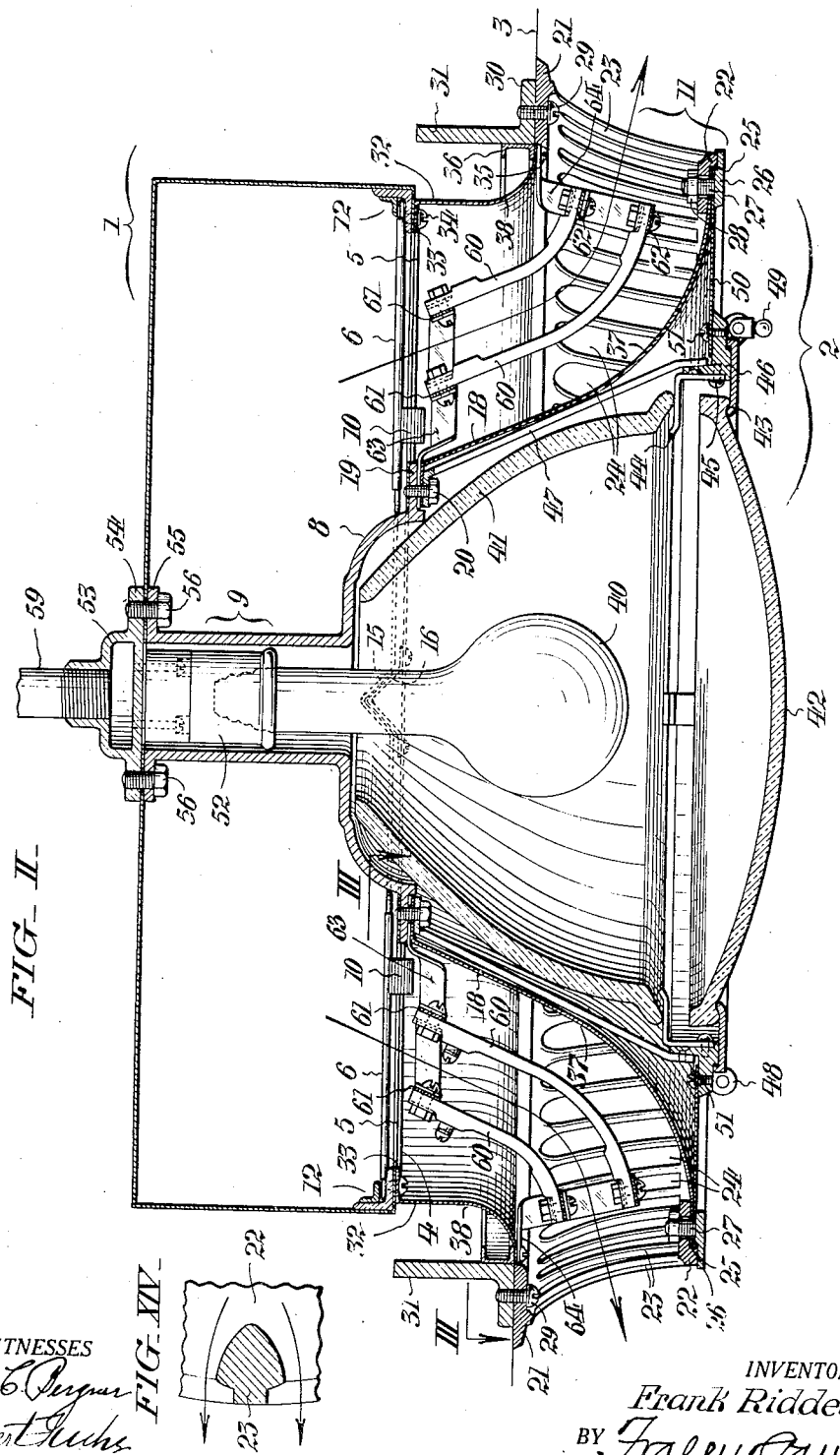

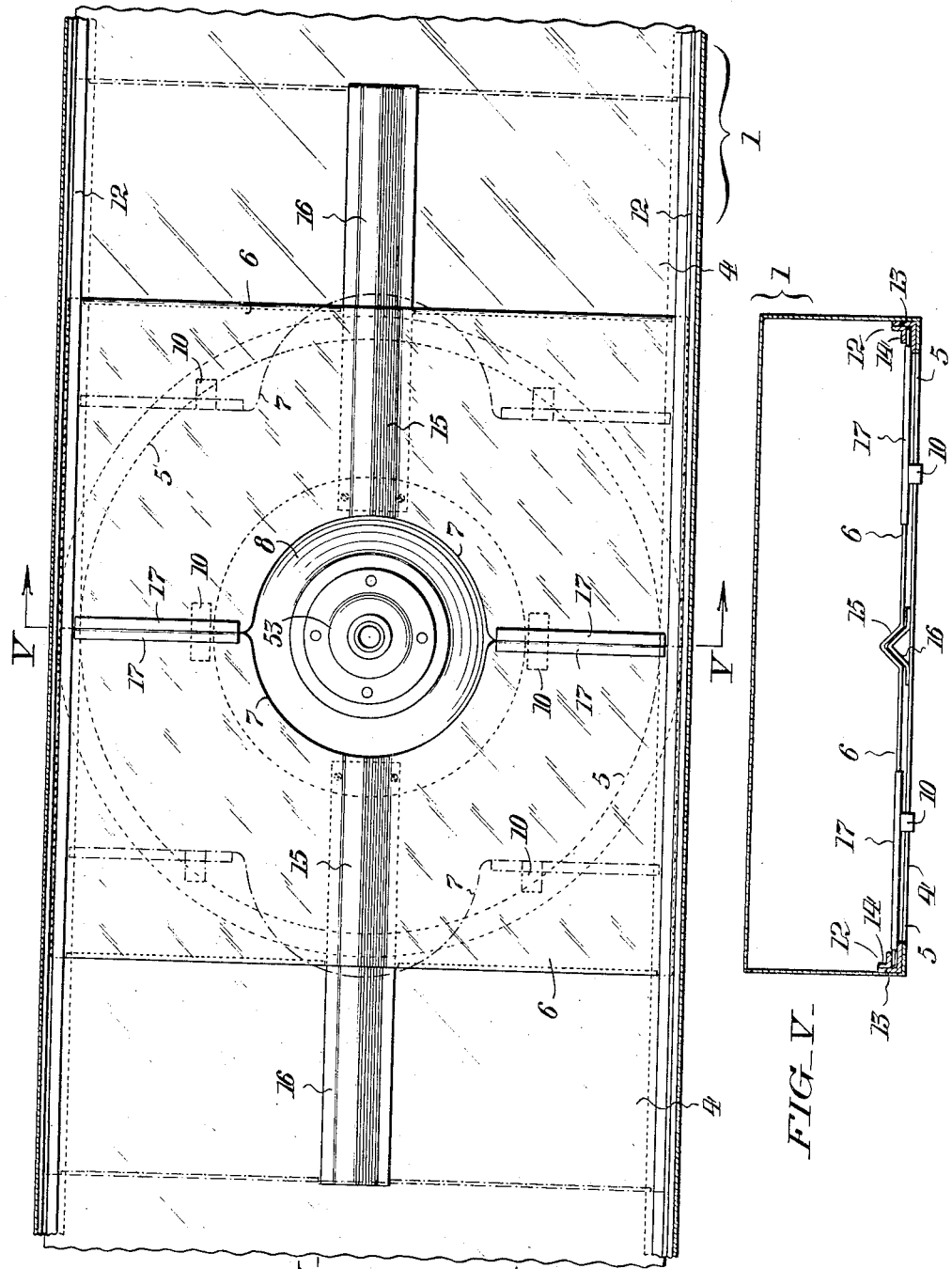

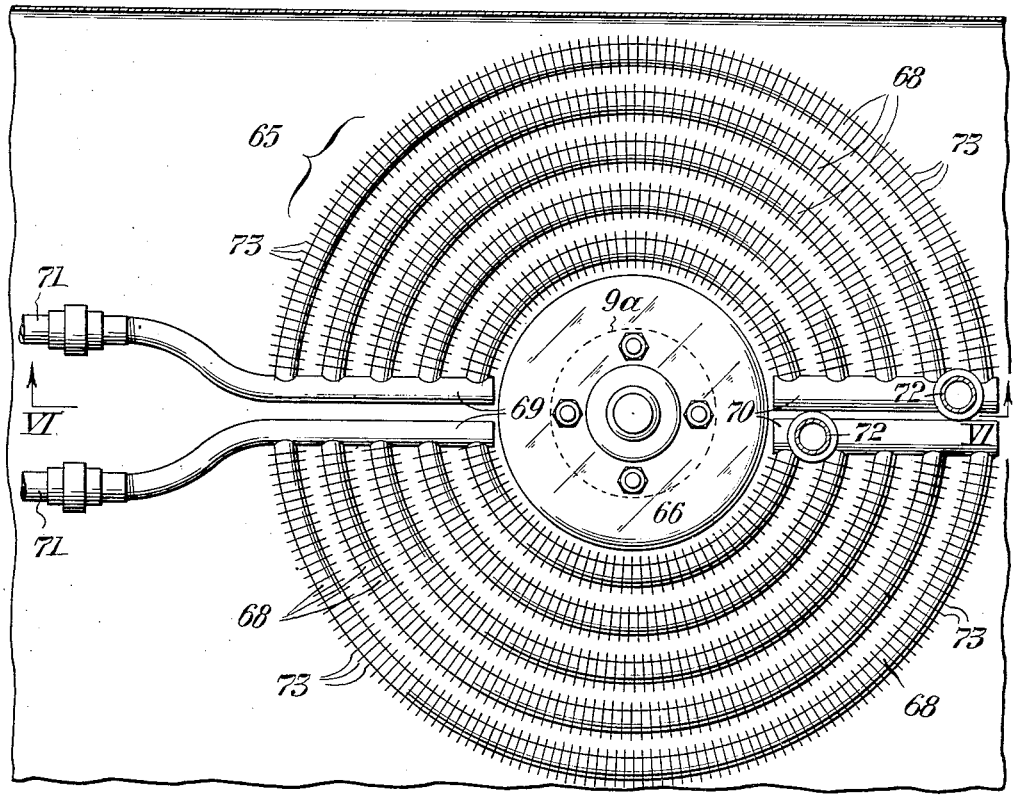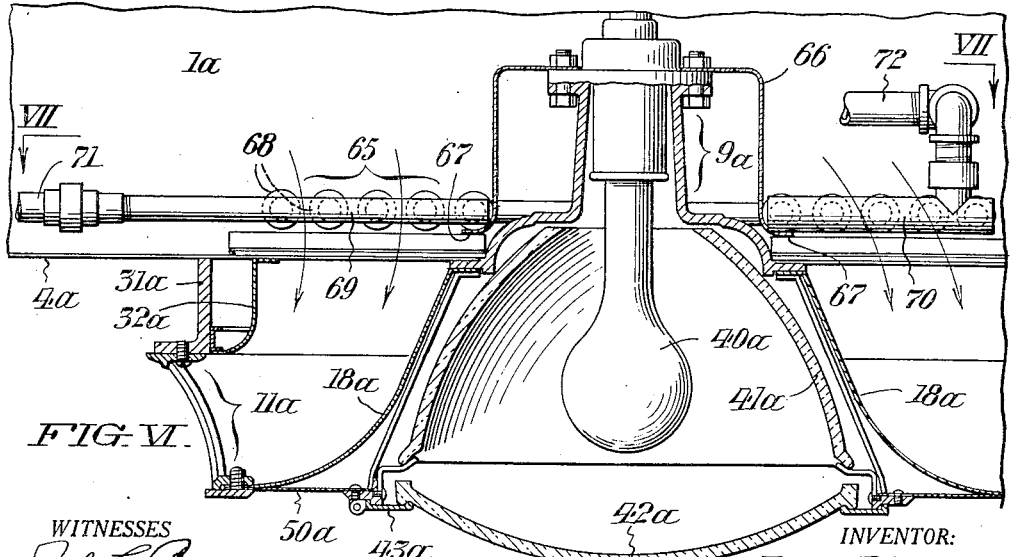

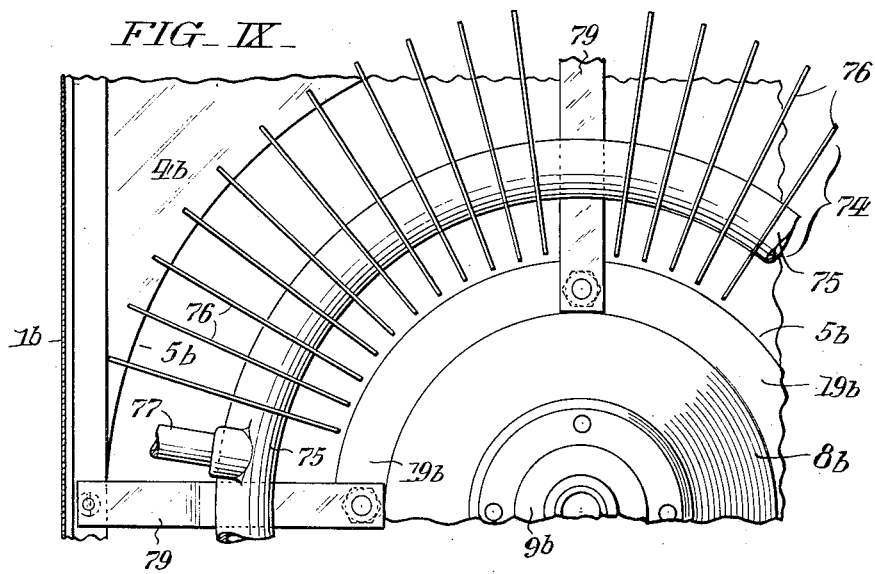
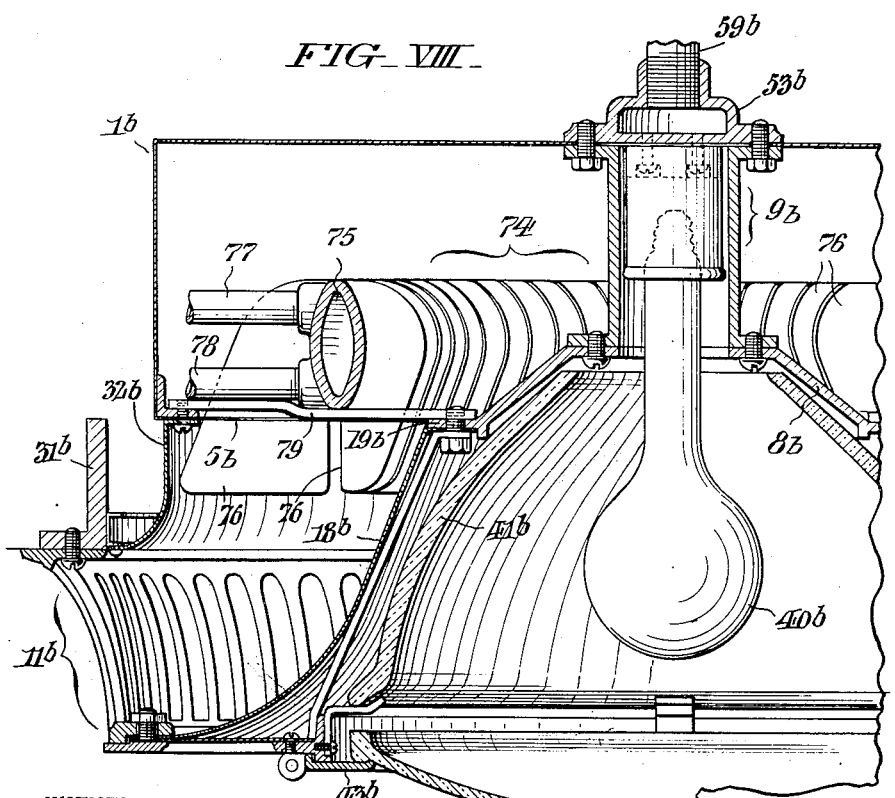

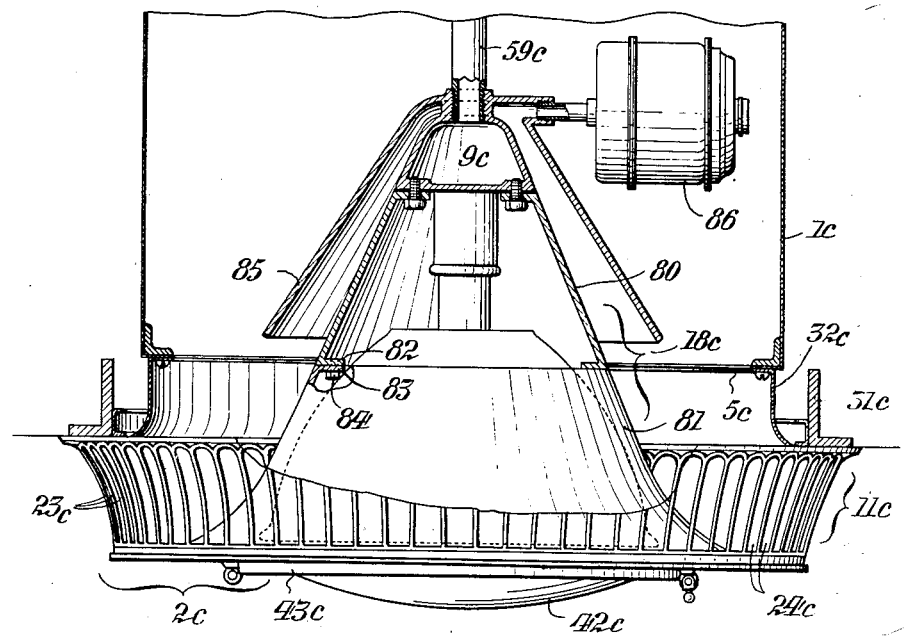
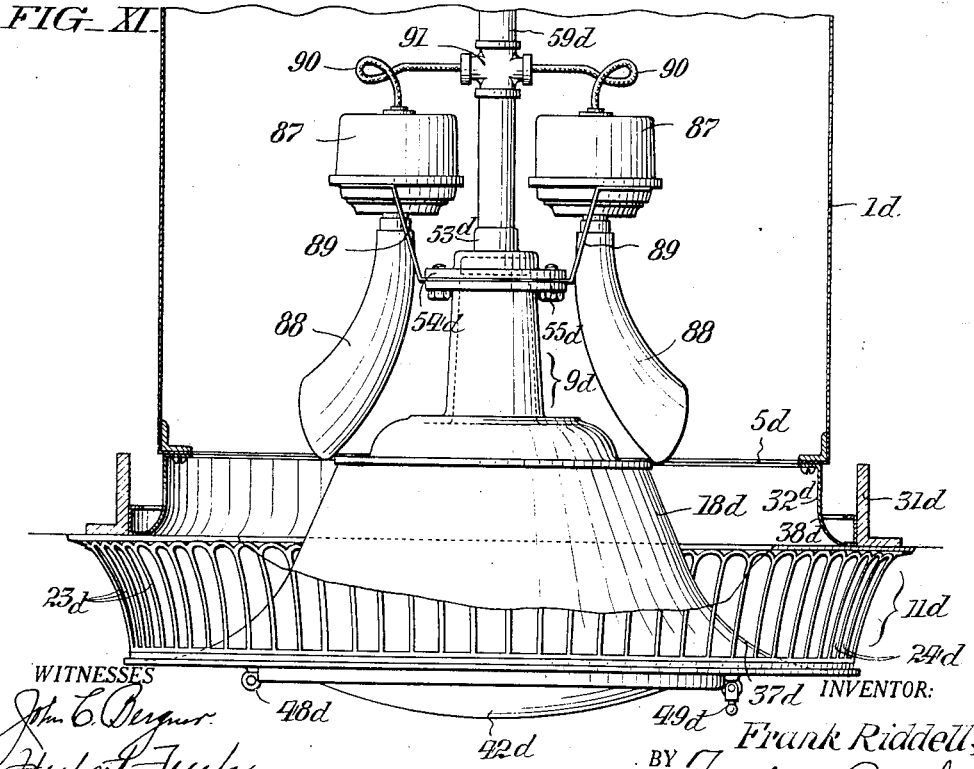

Aug. 6, 1935.   F. RIDDELL   2,010,322
COMBINED LIGHTING AND VENTILATING FIXTURE
Filed April 8, 1931   8 Sheets-Sheet 7
FIG. XII
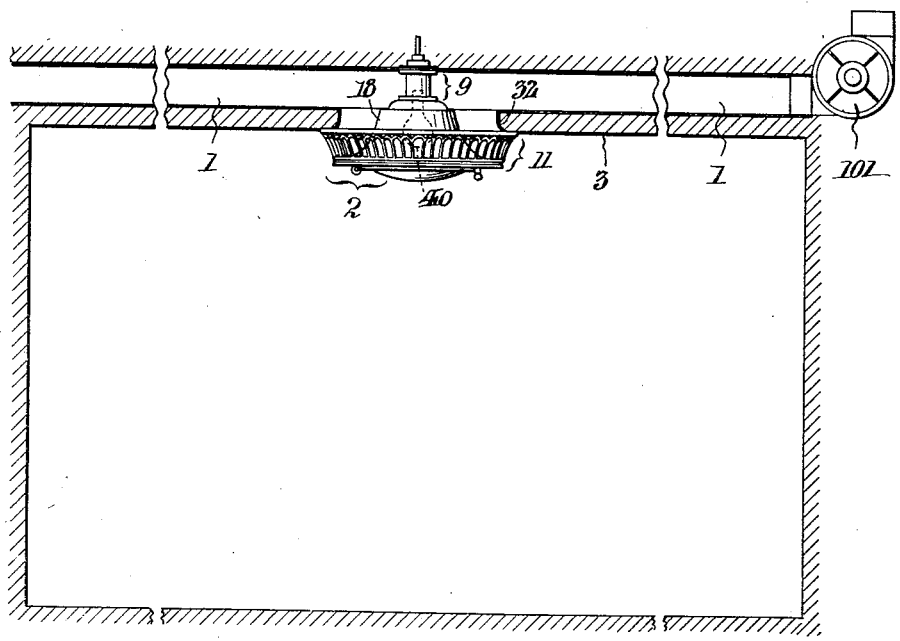
WITNESSES
John C. Bergner
Hubert Fuchs
INVENTOR:
Frank Riddell,
BY Falley Paul
ATTORNEYS.

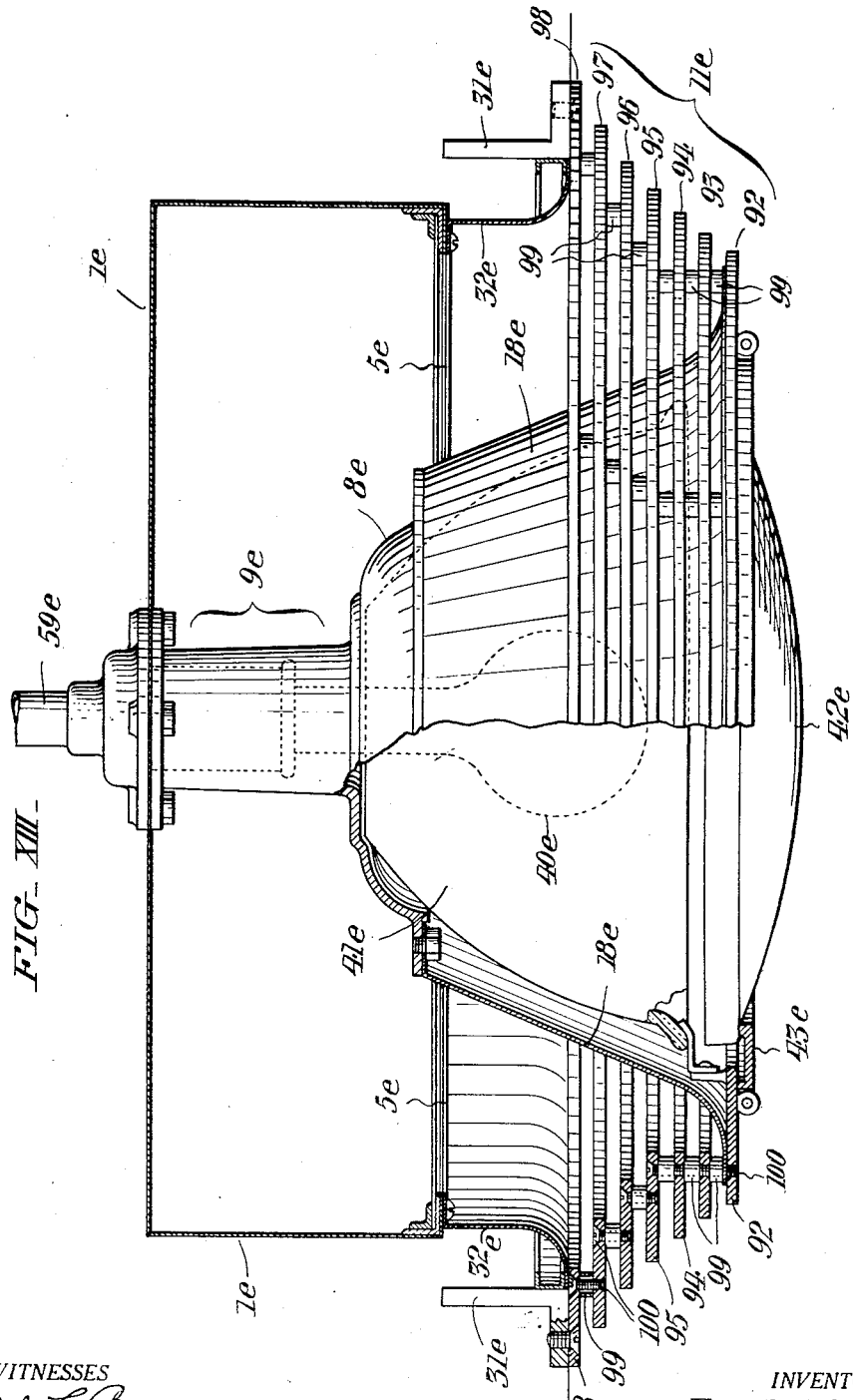

Patented Aug. 6, 1935

2,010,322

UNITED STATES PATENT OFFICE 2,010,322

COMBINED LIGHTING AND VENTILATING FIXTURE

Frank Riddell, Philadelphia, Pa.

Application April 8, 1931, Serial No. 528,544

11 Claims. (Cl. 98—37)

My invention relates to a lighting fixture suitable for use in connection with any enclosed space requiring both light and ventilation, such for example as a room, car, ship, bus or aircraft. It may conveniently be placed in or near the ceiling of a room and comprises a lighting element which is surrounded by a housing around which is formed a ventilating channel suitably protected and communicating with a suitable air conduit forming part of the ventilating system of the compartment to be lighted; and the primary thought involved in my invention is the attractive, compact, convenient and economical combination thus produced by the ventilating element (which may be used either for supply or withdrawal of air) and the lighting element so disposed as to be combined with the ventilating element.

In connection with such a fixture I have also shown means combined with it for heating or cooling air supplied to the compartment through the fixture. My invention also includes the capacity for conditioning this air supply by humidifying, ozonizing, fumigating, filtering or otherwise purifying the air if desired. I have also shown means whereby sound waves may be conducted and directed through the air passage of my fixture to the compartment to be lighted.

Other objects and advantages of my invention will become apparent from the detailed description following in connection with the attached drawings, whereof Fig. I is a side elevation of a ventilating and lighting fixture conveniently embodying my invention.

Fig. II is a sectional view of the fixture drawn to a somewhat larger scale than in Fig. I.

Fig. III is a fragmentary plan sectional view taken as indicated by the arrows III—III in Fig. II showing more particularly a form of electric means for heating the air as it passes through the fixture.

Fig. IV is a plan sectional view taken as indicated by the arrows IV—IV in Fig. I showing the details of a conduit through which the air is conducted for discharge through the fixture.

Fig. V is a cross sectional view of the conduit taken as indicated by the arrows V—V in Fig. IV.

Fig. VI is a sectional view similar to Fig. II of a modified form of my novel ventilating and lighting fixture in which a hot water or steam heating means is provided for warming the air previous to its discharge or in which cooled water or other heat absorbing means is provided for cooling the air previous to its discharge.

Fig. VII is a fragmentary plan section taken as indicated by the arrows VII—VII in Fig. VI.

Figs. VIII and IX are views corresponding to Figs. VI and VII showing an alternative form of steam or water heating means or refrigerant cooling means in connection with the fixture.

Figs. X and XI are fragmentary views partly in section and partly in elevation showing two different types of my fixture incorporating sound producing units or loud speakers.

Fig. XII is a diagrammatic, vertical sectional view illustrating my ventilating system.

Fig. XIII is an illustration partly in elevation and partly in section of a modified form of my fixture.

Fig. XIV is a cross sectional view of one of the connecting bars 23.

Referring first to the embodiment of my invention shown in Figs. I-V, the numeral 1 designates a conduit wherethrough air supplied from a suitable source of pressure is conducted in this instance for discharge from my improved ventilating fixture which is comprehensively designated 2. The conduit 1 is of rectangular cross sectional configuration, and is shown as built into the ceiling 3 of the room or corridor in which the fixture 2 is used. At the region of the fixture 2, the bottom 4 of the conduit 1 is provided with a circular outlet opening 5 through which the flow of air is controllable by means of a divided damper comprising the complemental components indicated at 6, 6. These damper components 6 are of sheet metal with semicircular cutouts 7 medially of their meeting edges jointly forming an opening to clear the bell 8 of a tubular member 9 constituting the top piece of the fixture, when the damper is closed as in Figs. II and IV. The damper components 6 are moreover provided with depending lugs 10 whereby they may be slid longitudinally of the conduit 1 with the aid of a suitable implement inserted through the interstices of a grille 11 constituting the bottom member of the fixture, or by removing a section of the grille and sliding the damper by hand. To preclude binding, the side edges of the damper components 6 are engaged in longitudinal guideways 12 provided for them in the lower corners of the conduit 1. These guideways 12 may be conveniently formed by use, in each instance, of two angle irons 13 and 14 spaced vertically as shown in Fig. V to receive the side edges of the damper components 6, and suitably made fast to each other and the conduit 1. For further assurance against binding and also for better guidance, the damper components 6 are formed with medial corrugations 15 that engage skids 16 affixed centrally and lengthwise of the bottom 4 of the conduit 1 at opposite sides of the outflow or inflow opening 5. It is also to be noted that the meeting edges of the damper components 6 are retroverted as at 17 to prevent the possibility of their riding over each other as the damper is closed and to provide stiffness to said damper components.

Intermediate the tubular top member 9 and the grille 11 of the fixture is a downwardly flared member 18 spun from sheet metal. Around its top, the member 18 has an inwardly reaching circumferential flange which abuts against and is made fast to a peripheral flange 19 on the bell 8 of the top member 9 by means of cap screws 20. The grille 11, is in the form of a casting with upper and lower rings 21, 22 in spaced horizontal planes, the said rings being joined by concaved connecting bars 23 which are regularly spaced to provide the apertures 24 by way of which air delivered through the conduit 1 is discharged from the fixture. The connecting bars 23 are formed of a stream lined cross section as shown in Fig. XIV, thus lessening the resistance to the air and preventing whistlings as air passes around them. As shown in Fig. II the lower ring 22 of the grille 11 is recessed at 25 to receive the bottom edge of the flared member 18; and a supplemental ring 26 holds the said edge within the recess 25. The supplemental ring 26 is provided at circumferential intervals with upstanding screw studs 27 which project through openings in the ring 22 of the grille 11 for application of securing nuts 28. The upper ring 21 of the grille 11 is likewise apertured at circumferential intervals for passage of securing screws 29 that take into the horizontal flanges 30 of angle lugs 31 embedded in the plaster of the ceiling 3. Another flared member 32 likewise of spun sheet metal surrounds the upper part of the member 18. As shown, an internal circumferential flange 33 at the top of the flared member 32 is secured, by means of screws 34, to the bottom 4 of the conduit 1; while the circumferential edge of said member is likewise secured, by means of screws 35, to a channel section ring 36 secured to the lugs 31. Referring still to Fig. II, it will be observed that the roundings 37, 38 respectively of the flared members 18 and 32 are concentric, and that as a consequence, there is formed a smooth walled passage between the outflow opening 5 in the bottom 4 of the conduit 1 and the interstices 24 of the grille 11 so that the air discharged from the fixture is distributed laterally in all directions at the ceiling level and at the same time diffused by the grille bars 23. The inner flared member 18 of the fixture serves as a housing for an electric lamp 40 and a reflector 41, the latter being of glass, metal or porcelain and appropriately configured to direct the light of the lamp 40 downwardly through a diffusing lens 42 in a door 43 that forms a bottom closure for the lamp chamber. The reflector 41 rests on angle clips 44 secured by means of screws 45 to still another ring 46 which is suspended by a number of straps 47 from the top member flange 19 of the fixture. As shown, the laterally turned upper ends of the straps 47 are engaged under the heads of the stud screws 20 hereinbefore referred to. At one side of the fixture, the ring 46 affords a hinge 48 for the lens door 43, and at the other side there is a latch means 49 to normally hold the lens door 43 closed. The interval between the lower ring 22 of the grille 11 and the ring 46 at the bottom of the flared lamp housing member 18 is closed in by an annular diaphragm 50 of sheet metal. The outer edge of this diaphragm 50 is clamped by the supplemental ring 26 while its inner edge is fastened down on to the top of the ring 46 by means of screws 51. The socket 52 for the electric lamp 40 is accommodated within the hollow of the tubular portion of the top member 9, and secured to a suspension piece 53 such as is used in hanging chandeliers, the said suspension piece being formed with a flange 54 for abutment against a flange 55 about the upper end of the member 9. Bolts 56 are employed to secure the member 9 to the suspension piece 53 and the top wall of the conduit 1 is shown clamped between the flanges 54 and 55, but does not necessarily require being clamped between these flanges. The wiring (not shown) for the lamp 40 may be passed through the tube 59 whereto the suspension piece 53 is secured.

The air passing through the fixture is heated by an electric means comprising a number of heating units 60 (Figs. II and III) which are curved to correspond to the cross sectional configuration of the air flow passage in the fixture. These heating elements 60 may be of any standard construction and, as shown, have their opposite ends connected to rings 61, 61 and 62, 62, the said rings being supported by radial brackets 63 and 64 respectively reaching laterally from the flange 19 of the member 9, and from the channel ring 36. Electric current may obviously be conducted to the heating elements 60, 60 in any convenient manner, and, if desired or found convenient, through the same tube 59 that carries the electric wiring furnishing current to the lamp 40. With the described arrangement the air forced under pressure from the conduit 1 out through the fixture is effectively warmed as a consequence of intimate contact with the several elements 60 before being laterally discharged through the grille 11.

The construction of the fixture illustrated in Figs. VI and VII is generally similar to that of the fixture of Figs. I-V, and the corresponding parts have been designated by the same reference numerals previously employed with the addition of the suffix "a". Here, however, the heating or cooling of the air is accomplished by a circular radiator 65 which is disposed concentrically about the top member 9a of the fixture within the conduit 1a, the said member 9a being in this instance surrounded by a cap 66 which is flanged as at 67 to support the radiator 65. This radiator 65 comprises a pair of semi-circular sections, each of which is formed of a multiplicity of finned tubes 68, one arranged within another in spaced relation, the said tubes being joined at their opposite ends by headers 69, 70. The heating or cooling fluid, as the case may be is conducted, in each instance, to the header 69 through a flow main 71, and, after circulating through the semi-circular radiator section, conducted from the header 70 through a return main 72. As shown, the flow and return mains 71 and 72 extend longitudinally of the conduit 1a for capacity to serve other fixtures in series with the one illustrated. The fins 73 on the radiator tubes it will be noted, are closely spaced so that the highest heating or cooling efficiency of the radiator is assured.

Figs. VIII and IX show a fixture with a somewhat different type of radiator 74 embodying but a single tubular coil 75 with radiating or heat absorbing fins 76 projecting outward and downward from opposite sides thereof, the steam, or hot water, or a cooling medium such as chilled water, ammonia and the like being conducted into and out of the radiator through pipe connections 77 and 78. In this modification, the radiator 74 is supported concentrically of the fixture by means of straps or bars 79 that bridge between the edge of the outflow opening 5b in the bottom 4b of the conduit 1b and the flange 19b of the member 8b of the fixture.

In Fig. X the construction of the fixture is modified somewhat for embodiment therewith of sound projecting means. As illustrated, the intermediate or lamp housing member 18c of the fixture is made in two sections 80, 81, which at the region of their juncture, are provided internally with abutment flanges 82, 83, and which are secured together by bolts 84 passing through said flanges. The upper member 9c of the fixture is here directly secured to the tube 59c, and provides a bell 85 around the upper section 80 of the member 18c which acts to direct sound waves transmitted from a loud speaker unit conventionally shown at 86, downward into the air stream flowing through the annular air passage of the fixture.

In Fig. XI two speaker units 87 are individually fitted with curved horns 88 to direct the sound waves downward into the air flow passage of the fixture. As shown, the units 87 are supported by brackets 89 clamped at their lower ends between the flanges 54d, 55d respectively of the suspension piece 53d and the member 9d of the fixture. The current conducting wires 90 for the sound producing units 87 are in this instance first passed through the pipe 59d which serves the conductors for the lamp, and emerge at the level of the units 87 through a cross fitting 91 interposed in the said pipe.

In both fixtures shown in Figs. X and XI, the sound producing units 86, 87 are sufficiently elevated to permit the additional insertion of electric heating means such as illustrated in Fig. II, or they can be elevated to permit the additional insertion of either of the steam or hot water heating devices or cooling devices shown in Figs. VI, VII and VIII, IX.

In Fig. XIII I have shown a modified form of my fixture in which in place of the grille 11 there are substituted a series of annular plates 92, 93, 94, 95, 96, 97, 98, mounted in spaced relationship to each other by means of spacers 99 and screws 100, the upper annuli being larger than the lower ones so as to give to the assemblage a flaring character. This arrangement has the advantage of allowing free passage of the air without the presence of any conspicuous opening since to one standing below the level of this fixture it is not apparent that the spaces between the successive annuli are air channels.

Thus far I have described my improved lighting fixture in connection with its use to supply air derived from a suitable source to the compartment which is lighted by the fixture, and I have shown means whereby the air thus supplied may be heated or cooled, if so desired, and also may have impressed upon or through it sound waves from a suitable sound producing unit or units. Air or other air conditioning elements such as air filtering, humidifying, ozonizing or fumigating may also be incorporated with my device.

But my invention is not thus limited, for instead of using the conduit 1 for air supply it may be used for the exhaustion of air from the compartment. To illustrate this I have shown in Fig. XII a diagrammatic or fragmentary sectional view of a compartment having my fixture applied to it. It will be noted that conduit 1 is in communication with a suitable blower or exhaust fan 101 for exhausting or supplying air as desired. I have already fully described the use of my fixture as a means of supplying fresh air near the ceiling of the compartment, but by using a suitable exhaust fan the air or fumes may be drawn from the compartment through the annular channel which surrounds the housing of the lighting element, instead of being discharged thererearound.

In either case my fixture combines the housing of the lighting element with a supporting element which is furnished with an inconspicuous air channel or passageway which forms part of the ventilating system, of the compartment without being distinctly noticeable as such. I thus avoid the necessity of separate covered or grilled openings for the supply or exhaustion of air such as might otherwise be needed. My fixture therefore affords a convenient, economical, compact and attractive means of combining in one structure both the lighting and the ventilating elements for the compartment, including also, so far as desired, concealed means for heating, cooling or conditioning air and also, if desired, loud speaker units. It will be observed that the surface of the housing of the lighting element is shaped to form a smooth and easy curved passage which minimizes the friction of the air passing through the passage, and also that the inner surfaces of these housings are shaped as to have value as a supplemental reflector of the light produced in the lighting fixture.

Having thus described my invention, I claim:

1. In a ventilating system of the character described, the combination with an apertured ceiling; of a deflector at the ceiling aperture, for preventing vertical air-blow thereat, with its margin below the ceiling, and an annular opening between ceiling margin and deflector; and a series of superposed spaced apart flat rings interposed between the outer deflector margin and the ceiling aperture margin.

2. In a ventilating system of the character described, the combination with an apertured ceiling; of a deflector at the ceiling aperture, for preventing vertical air-blow thereat, with its margin below the ceiling, and an annular opening between ceiling margin and deflector; and a series of spaced apart overlapping flat rings interposed between the deflector margin and the ceiling aperture margin, the rings being of greater and greater diameter from the deflector margin toward the ceiling.

3. In a ventilating system of the character described, the combination with an apertured ceiling; of a deflector at the ceiling aperture, for preventing vertical air-blow thereat, with its margin below the ceiling, and an annular opening between ceiling margin and deflector; and a series of spaced apart overlapping flat rings interposed between the deflector margin and the ceiling aperture margin, and mounted one above another with interposed spacers.

4. In a ventilating system of the character described, the combination with an apertured ceiling having an air passage thereabove opening at its lower side downward through the ceiling aperture, and means for introducing air through said passage to said aperture; of a deflector in the ceiling aperture, for preventing downblow of air therefrom, with its margin below the ceiling and an annular opening between the ceiling margin and deflector for discharging the air along the ceiling; and a series of superposed but spaced-apart flat rings interposed between the outer deflector margin and the ceiling aperture margin.

5. In a ventilating system of the character described, the combination with an apertured ceiling having an air passage thereabove opening at its lower side downward through the ceiling aperture, and means for introducing air through said passage to said aperture; of a deflector in the ceiling aperture, for preventing downblow of air therefrom, with its margin below the ceiling and an annular opening within the ceiling margin around the deflector; and means for varying the effective size of said annular opening, and thus controlling and regulating the downflow of air from said passage.

6. In a ventilating system of the character described, the combination with an apertured ceiling having a substantially horizontal air passage thereabove opening at its lower side downward through the ceiling aperture, and means for introducing air through said passage to said aperture; of a downward expanding hollow deflector exposed in said passage and extending down through the ceiling aperture, and flaring outward therebelow, so as to divert and discharge the outflow of air along the ceiling surface, and dampers in said passage at either side of said deflector, movable along the lower side of the passage toward and away from the deflector, for controlling and regulating the downflow of air from said passage to said ceiling aperture.

7. In a ventilating system of the character described, the combination with an apertured ceiling having a substantially horizontal air passage thereabove opening at its lower side downward through the ceiling aperture; of a hollow deflector mounted on the roof of said passage and extending down across the passage through the ceiling aperture, and flaring outward therebelow, so as to divert and discharge the outflow of air along the ceiling surface.

8. In a ventilating system of the character described, the combination with an apertured ceiling having a substantially horizontal air passage thereabove opening at its lower side downward through the ceiling aperture, and means for introducing air through said passage to said aperture; of a hollow deflector mounted on the roof of said passage and extending down across the passage through the ceiling aperture, and flaring outward therebelow, so as to divert and discharge the outflow of air along the ceiling surface, and also affording room therewithin for illuminating means.

9. In combined lighting and ventilating systems, a source of air supply, and a fixture comprising an inner tubular suspension member having an outwardly-flaring lower portion, a concentric circumferentially-apertured outer member jointly affording with the suspension member an annular elbowed-passage, a grille intermediate the lower peripheral edges of such members, said grille embodying upper and lower rings joined by outwardly-concaved connecting bars of stream-lined cross-section to lessen the resistance to air flowing therethrough from the source of supply for radial diffusion immediately below and substantially parallel to the sustaining surface.

10. A ventilating fixture comprising an outer tubular component including a grille-extension projecting beyond the sustaining means, an inner tubular member affording jointly with the tubular component an annular passage, of elbowed cross-section, by way of which air is conducted from a source of supply for radial discharge through the grille-extension substantially parallel to the exposed surface of the sustaining means, and electric heater means supported between the walls of the annular passage consisting of a multiplicity of radially-arranged resistor bars conformative with the cross-sectional curvature of the elbowed air flow passage.

11. A ceiling ventilating fixture comprising a tubular component with a grille-extension projecting below the ceiling, a concentric inner tubular component having a flared lower end affording jointly with the outer tubular component an annular passage, of elbowed cross-section, a substantially horizontal conduit supplying air from an opening in its lower side to said annular passage for radial diffusion through the grille-extension horizontally contiguous the ceiling surface, said inner component extending up through said opening in the bottom wall of the conduit to the top wall thereof, and a divided damper of slidable sections to control flow of air through the opening aforesaid.

FRANK RIDDELL.